United States Patent
Ravish et al.

(10) Patent No.: US 7,702,417 B2
(45) Date of Patent: *Apr. 20, 2010

(54) AUTOMATICALLY GENERATING CODE FROM DRAWING SPECIFICATIONS FOR USE IN MOTION CONTROL

(75) Inventors: Sushrutha Ravish, Karnataka (IN); Praveen Shivananda, Karnataka (IN); Sundeep Chandhoke, Austin, TX (US); Mahesh Ramchandani, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 924 days.

This patent is subject to a terminal disclaimer.

(21) Appl. No.: 11/343,410

(22) Filed: Jan. 31, 2006

(65) Prior Publication Data

US 2007/0179644 A1 Aug. 2, 2007

(51) Int. Cl.
*G06F 19/00* (2006.01)
*G05B 19/42* (2006.01)
*G06F 3/048* (2006.01)
*G06F 9/44* (2006.01)

(52) U.S. Cl. .................. 700/182; 700/86; 715/771; 717/106

(58) Field of Classification Search ............. 700/86–88, 700/182, 186, 187, 119, 159, 264; 715/211, 715/771; 717/106, 136; 345/440, 441
See application file for complete search history.

(56) References Cited

U.S. PATENT DOCUMENTS

| | | | |
|---|---|---|---|
| 5,511,147 A * | 4/1996 | Abdel-Malek | 700/264 |
| 6,253,116 B1 * | 6/2001 | Zhang et al. | 700/119 |
| 6,576,861 B2 * | 6/2003 | Sampath et al. | 219/121.48 |
| 6,608,638 B1 * | 8/2003 | Kodosky et al. | 715/771 |
| 6,609,044 B1 * | 8/2003 | Basista et al. | 700/166 |
| 6,658,325 B2 | 12/2003 | Zweig | |

(Continued)

OTHER PUBLICATIONS

Gaoliang et al., "An Internet-based system for setup planning in machining operations", Proceedings of the 10th IEEE International Conference on Engineering of Complex Computer Systems (ICECCS'05), Jun. 16-20, 2005, pp. 245-251.*

(Continued)

*Primary Examiner*—Crystal J Barnes-Bullock
(74) *Attorney, Agent, or Firm*—Meyertons Hood Kivlin Kowert & Goetzel, P.C.; Jeffrey C. Hood; Joel L. Stevens

(57) ABSTRACT

System and method for utilizing drawing specifications for use in motion control. Elements in a drawing specification may be automatically identified. The drawing specification may include one or more drawings, digital files, AutoCAD drafting files, and/or drawing specifications. Code may be automatically generated based on the one or more elements in accordance with a schema, and may include instructions in a data representation language, e.g., a markup language such as HTML, XML, etc. The automatically generated code may include move operations, e.g., arc, contour, line, raise, lower, halt, begin, etc., with associated parameters, e.g., move constraints, digital outputs, position compares, etc. The schema may include one or more blocks, each associated with a portion of the drawing specification, one or more elements, each associated with a block, one or more move operations, each associated with an element, and one or more parameters, each associated with a move operation.

67 Claims, 8 Drawing Sheets

U.S. PATENT DOCUMENTS

| | | | |
|---|---|---|---|
| 6,766,216 B2 * | 7/2004 | Erichsen et al. | 700/159 |
| 6,834,249 B2 | 12/2004 | Orchard | |
| 7,024,255 B1 | 4/2006 | Brown | |
| 7,076,322 B2 | 7/2006 | Chandhoke | |
| 7,076,411 B2 | 7/2006 | Chandhoke | |
| 7,269,471 B2 * | 9/2007 | Kadono | 700/159 |
| 7,369,917 B2 * | 5/2008 | Ravish et al. | 700/186 |
| 2002/0126151 A1 | 9/2002 | Chandhoke et al. | |
| 2002/0191023 A1 | 12/2002 | Chandhoke et al. | |
| 2003/0144751 A1 | 7/2003 | Chandhoke et al. | |
| 2006/0064183 A1 | 3/2006 | Chandhoke | |
| 2007/0022194 A1 | 1/2007 | Brown | |
| 2008/0059871 A1 * | 3/2008 | Ravish et al. | 715/211 |

OTHER PUBLICATIONS

Mervyn et al., "Development of an Internet-enabled interactive fixture design system", Computer Aided Design, vol. 35, Issue 10, Sep. 1, 2003, pp. 945-957.*

Osuna et al., "Assembly and Task Planning in a Collaborative Web-based Environment Based on Assembly Process Modeling Methodology", Proceedings on the 5th IEEE International Symposium on Assembly and Task Planning, Jul. 10-11, 2003, pp. 79-84.*

Dereli et al., "A note on the use of STEP for interfacing design to process planning", Computer Aided Design, vol. 34, Issue 14, Dec. 1, 2002, pp. 1075-1085.*

Zhang et al., "Semantic Integration of XML Schema", Proceedings of the 1st International Conference of Machine Learning and Cybernetics, Nov. 4-5, 2002, vol. 2, pp. 1058-1062.*

Kitagishi et al., "Development of Motion Data Description Language for Robots Based on eXtensible Markup Language - Realization of Better Understanding and Communication via Networks", International Conference of Intelligent Robots and System, Sep. 30-Oct. 5, 2002, vol. 2, pp. 1145-1151.*

U.S. Appl. No. 11/334,782, entitled "System and Method for Automatic Sorting of Elements in Drawing Specifications for Efficient Tracing Using Motion Control", filed Jan. 17, 2006, by Sundeep Chandhoke.

"Mint—The Real-time Automation Language"; Mint Programming Language from Baldor's Motion Solutions Catalog; 2005; 16 pages; retrieved from the Internet: http://www.baldor.com/pdf/literature/BR1202-BMint.pdf.

"AutoCAD translator CADTODMC"; date unknown; p. 94; Galil Motion Control, Inc.

* cited by examiner

AUTOMATICALLY GENERATING CODE FROM DRAWING SPECIFICATIONS FOR USE IN MOTION CONTROL

FIELD OF THE INVENTION

The present invention relates to the field of motion control, and more particularly to a system and method for utilizing drawing specifications for motion control.

DESCRIPTION OF THE RELATED ART

Drawing specifications often describe or specify a desired behavior or product of various systems, e.g., motion control systems. For example, an architect may draw or draft a specification that specifies a desired product to be crafted from a raw material, e.g., the desired shape or design required from, for example, a piece of wood or metal. Similarly, an electrical engineer may draw a detailed electrical circuit that may be etched on a silicon wafer.

In recent years, various systems and methods have attempted to generate motion control from the drawing specifications. Some software systems allow the user to specify motion control steps during the drafting of the drawing specification, e.g., by manually inserting motion control operation specifications in the drawing specifications, i.e., via a computer; however, this can be tedious and hard to understand, and in many cases, may become overly complex and error prone.

Thus, improved systems and methods for utilizing drawing specifications for motion control are desirable.

SUMMARY OF THE INVENTION

Various embodiments of a system and method for utilizing drawings for motion control are presented below.

In some embodiments, a plurality of elements in a drawing specification (possibly including multiple drawing specifications) may be automatically identified. Additionally, the drawing specification may include or be included in one or more digital files, e.g., one or more AutoCAD digital drafting files. The file(s) may be present on a computer system or may be accessed or downloaded from another computer system via a network. In some embodiments, the drawing specification may include one or more drawings. An image acquisition device, e.g., a scanner, a digital camera, or other appropriate device(s), may obtain an image of the drawing(s), which in turn may be analyzed on or by the computer system.

In preferred embodiments, the plurality of elements of the drawing specification may be automatically identified by a program executing on the computer system. In some embodiments, the program executing on the computer system may include one or more text-based programs and/or one or more graphical programs, such as, for example, those implemented in or by the LabVIEW graphical program development environment provided by National Instruments Corporation. Additionally, the program may include a graphical user interface (GUI) which may execute on the computer system or the other computer system coupled to the computer system.

In some embodiments, the elements may include any of numerous lines and forms specified or included in the drawing specification. For example, the drawing specification may include one or more lines, polygons, arcs, splines, alphanumeric characters with one or more associated fonts, ellipses, and/or clouds, among others. Note that in embodiments where the drawing specification includes one or more AutoCAD digital drafting files, the elements may include entities found or specified in a DXF file format (e.g., the AutoCAD digital drafting file format), although other drafting file formats are also contemplated.

In some embodiments, elements may be nested, i.e., located within one or more other elements in the drawing specification. Each of these elements, and combinations thereof, may be automatically identified, e.g., via the program executing on the computer system. In some embodiments, complex elements may include one or more elements, e.g., subelements, in the drawing specification and may be automatically identified. In some embodiments, one or more elements may form shapes. For example, a series of connected lines and arcs, or other equivalent elements (and/or complex elements), may form a shape, such as, for example, a crescent moon, and may be automatically identified as such. In some embodiments, the shapes may comprise one or more sub-shapes, which themselves may comprise one or more elements. Note that in descriptions herein, references to elements may also refer to complex elements included in the drawing specification.

Code for implementing motion control may be automatically generated based on the identified elements in accordance with a schema. Similar to above, the automatic generation may be performed by one or more graphical and/or text-based programs which may be executing on a host computer locally or remotely. In some embodiments, the code may be generated in a data representation language. For example, the code may be generated in a markup language, such as, for example, hyper-text markup language (HTML) or extensible markup language (XML), among others.

In some embodiments, the motion control operations specified by the generated code may be implemented via a motion control device. In one embodiment, the code may include or specify various operations usable by the motion control device, such as (moving in an) arc, line, or contour, raise, lower, halt, begin, etc. In some embodiments, the motion control device may be a machining device that may draw, trace, etch, and/or cut various materials. The materials may include, for example, one or more of metal, wood, paper, silicon, polymer(s), chemical compound(s), and chemical element(s), among others.

As indicated above, the generated code may include one or more automatically generated move operations. For example, in motion control for machining operations, e.g., etching shapes in materials, the automatically generated code may include raise, move, and lower operations, among others. In some embodiments, the user, or other source, e.g., program, configuration file, etc., may, e.g., via the GUI, enable or disable the raise and lower operations, and additionally, may specify the tool-depth, i.e., the height of the raise and lower operations (if they are enabled). Such operations may allow the material to be cut, etched, traced, etc., in such a way that the now etched, or otherwise modified, material's design resembles the drawing specification. Said another way, because the generated code includes raise and lower operations, moving the tool between different elements may not result in the materials being cut, etched, traced, or otherwise modified undesirably, e.g., modified outside of the borders of the elements.

In some embodiments each of the move operations may include one or more associated move parameters. The move parameters may include one or more digital outputs which may transmit move information to one or more external devices. For example, a digital output may include a move completion signal; in other words, information regarding the movement may be transmitted to the external device(s) upon completion of the movement. The digital output may include a move initiation signal that may be transmitted to the external device(s) upon initiation of the movement. As a specific example, an external laser, e.g., one performing, for example, cutting of a material, may turn on and off upon receiving initiation and completion signals respectively. In some embodiments, the move parameters may include a position compare, i.e., breakpoint, where the controller may transmit information to the external device(s) upon reaching a specified condition, e.g., a specified position. For example, upon reaching a specified position, the controller may transmit information to, for example, a digital camera, which may capture a digital photograph of a specified object, e.g., a unit under test, such as, for example, a circuit board. In some embodiments, the breakpoint may also specify a set, a toggle, or a reset, among others, of one or more of the axis parameters of the motion control device. In one embodiment, the position compare may be performed cyclically, i.e., periodically, according to specified time or position intervals which may also be specified as a move operation parameter. Note that position compares, and, in particular, those that are periodic, may be especially useful in synchronizing the external device(s) with the motion controller.

In some embodiments, the move parameters may include one or more move constraints, i.e., attributes of the movement of the motion control device, e.g., allowed movements, velocity, acceleration, deceleration, and jerk, among others. For example, if the motion control device cuts a material with an obstacle on or near the surface of the material, the move constraints may specify that only movements around the obstacle are "allowed". In other words, the move constraints may allow the material to be cut, or to be modified via some other equivalent operation, in a desirable fashion. As indicated above, the move constraints may also specify the rate at which the motion is performed, e.g., via the velocity, acceleration, deceleration, and/or jerk move constraints.

In some embodiments, the parameters may be specified via various methods, e.g., automatically, or via a user or other system, at various times. For example, a user, e.g., via the GUI, or automation system may specify upper and lower bound velocity, acceleration, deceleration, and/or jerk constraints before automatic generation of the code. These specifications may be especially desirable in systems where the controlled device must operate within a certain velocity range in order to avoid damage of the material and/or the device. For example, use of a massive cutting tool may impose upper bounds on velocity and/or acceleration due to the tool's size and weight. As another example, the thickness of the material being cut may impose an upper bound on the velocity, e.g., a laser cutting a two-inch sheet of metal may require that the laser move slowly in order to achieve the cut as provided by the specification. In these cases, the code may be automatically generated in accordance with the specified bounds, i.e., the move constraint parameters may be constrained to be within the upper and/or lower bounds. Additionally or alternatively, the parameters may be specified subsequent to automatic code generation; in these cases, the code may be automatically modified or regenerated in accordance with the specifications. Further modifications of the automatically generated code will be described in more detail below.

As indicated above, the code may be automatically generated according to a schema. In some embodiments, the schema may be organized according to the following descriptions. The automatically generated code may have one or more blocks, with associated information regarding each of the one or more blocks. In some embodiments, the blocks may correspond to respective portions of the drawing specification, e.g., the portions may include, for example, one or more drawings, digital files, and/or AutoCAD digital drafting files, among others. Each block may in turn have one or more associated elements, and information regarding each of the one or more associated elements. The elements included in the generated code may represent or correspond to the automatically identified elements described above. As indicated above, each element may have one or more associated move operations, e.g., line, contour, and/or arc, among others. As also indicated above, each move operation may have one or more associated parameters, e.g., move constraint(s), digital output(s), and/or breakpoint(s), among others.

In some embodiments, the generated code may be suitable for direct implementation or deployment on a motion control device, or a controller for the motion control device. In alternate embodiments, the code may be generated in a generic language, e.g., a generic language, such as, for example, XML, that may in turn be translated into any of various desired languages, such as C, Pascal, Fortran, Java, graphical programming languages, e.g., LabVIEW, scripting languages, various third-party languages, and/or various platform specific languages, among others. In some embodiments, the user (e.g., via the GUI) may choose an ultimate destination language to which the generic code may be automatically converted, or provide code that can translate the generated code to a desired destination language. This code encoded in a destination language may be implemented directly onto the motion control device, or alternatively, may be implemented via a controller. In some embodiments, the code may include or be used to generate API calls for the motion control device. The destination code, or intermediate code, may include one or more graphical programs and/or text-based programs. In one embodiment, the code may include pseudo code that may be automatically documented and easily understood.

The GUI may also display a visual representation of the generated code to the user via the display of the computer system. In some embodiments, the user may be able to choose viewing preferences in the GUI such that the move operations may or may not be displayed. For example, the GUI may display dotted lines, illustrating move operations (as well as other inserted operations, e.g., raise and lower operations) according to the user's viewing preferences. Note that the user's viewing preferences are not limited to move operations, and in fact, other viewing preferences are envisioned, such as window size, window placement, colors, and text fonts and sizes, among others.

In some embodiments, user input received to the GUI may invoke one or more of the automatic identification and the automatic generation of code.

In some embodiments, the method may also include receiving input specifying modification to the generated code. The input may be received by the user, e.g., via the GUI, or by another device or system, e.g., a computer system. The modification may include modifying existing portions of the generated code, e.g., machine tool operations, elements, raise and lower dimensions, etc., and/or adding new portions to the generated code, e.g., adding new elements, move operations, or other suitable portions of code to the generated code. Additionally, as described above, the modification may include modifying or specifying one or more parameters of the move operations included in the generated code. For example, the input may specify removal of a breakpoint from or addition of a breakpoint to a move operation. Similarly, the input may specify the addition of a digital output or a modification of a digital output such that it transmits specific data, e.g., command(s), string(s), number(s), etc., to one or more external devices. Note that any of various parameters may be added or modified as desired, and the above listed parameter modifications are exemplary only.

In some embodiments, the generated code may be displayed in a text format, e.g., the GUI may show the generated code itself, such as code generated in XML. In this case, the user may change the generated code directly, e.g., via a keyboard coupled to the computer system.

In other embodiments, the generated code may be displayed in a graphical format. For example, the GUI may have graphical representations of the code that may be modified graphically, e.g., using a mouse. For instance, the user may change a move operation parameter by double-clicking one of the parameters and entering a new one, e.g., via a keyboard coupled to the computer. In some embodiments, the user may change the blocks, the elements, the machine move operations, the move operation parameters, or other suitable properties of the generated code by dragging and dropping the lines or the elements displayed in the GUI (e.g., the visual representation of the generated code). Thus, the generated code may be modified via various methods; however, it should be noted that embodiments of the present invention are not limited to the modification methods described above and that other methods are envisioned.

After receiving input specifying these modifications to the generated code, the method may also include automatically modifying the generated code based on the modifications specified by the user (or another device or system) in accordance with the schema. The modified code may subsequently be modified and generated according to further input and/or implemented for motion control as indicated above, e.g., in an iterative manner.

BRIEF DESCRIPTION OF THE DRAWINGS

A better understanding of the present invention can be obtained when the following detailed description of the preferred embodiment is considered in conjunction with the following drawings, in which.

Figure 1A:
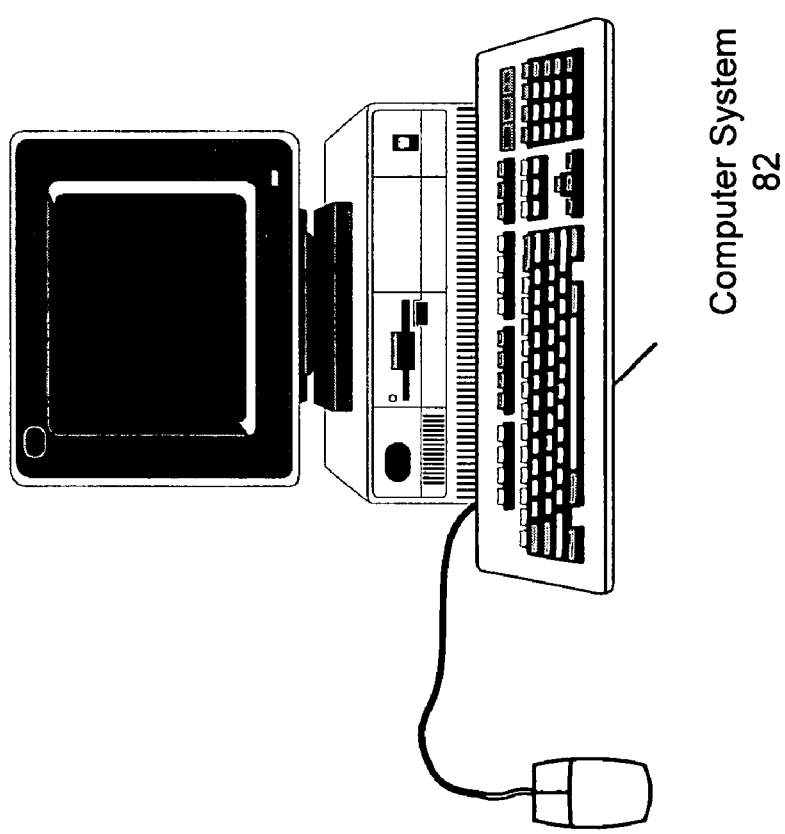
FIG. 1A illustrates a computer system, according to one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 10/051,474 titled "System and Method for Graphically Creating a Sequence of Motion Control Operations," filed Jan. 18, 2002.

U.S. patent application Ser. No. 10/051,268 titled "System and Method for Programmatically Generating a Graphical Program Based on a Sequence of Motion Control, Machine Vision, and Data Acquisition (DAQ) Operations," filed Jan. 18, 2002.

U.S. patent application Ser. No. 10/051,599 titled "System and Method for Invoking Execution of a Sequence of Operations that Includes Motion Control, Machine Vision, and Data Acquisition (DAQ) Functionality," filed Jan. 18, 2002.

U.S. patent application Ser. No. 11/226,863 titled "Automatic Generation Of A Motion Controller," filed Sep. 14, 2005.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82, according to one embodiment of the present invention.

As shown in FIG. 1A, the computer system 82 may include a display device operable to display a program which may implement various embodiments of the present invention. The display device may also be operable to display a graphical user interface or front panel of the program during execution of the program. The graphical user interface may comprise any type of graphical user interface, e.g., depending on the computing platform. In some embodiments, the program executing on the computer system 82 may be a graphical program.

The computer system 82 may include a memory medium(s) on which one or more computer programs or software components according to one embodiment of the present invention may be stored. For example, the memory medium may store one or more programs that are executable to perform the methods described herein. Additionally, the memory medium may store a programming development environment application, e.g., a graphical programming development environment application used to create and/or execute graphical programs. The memory medium may also store operating system software, as well as other software for operation of the computer system. Various embodiments further include receiving or storing instructions and/or data implemented in accordance with the foregoing description upon a carrier medium.

Figure 1B:
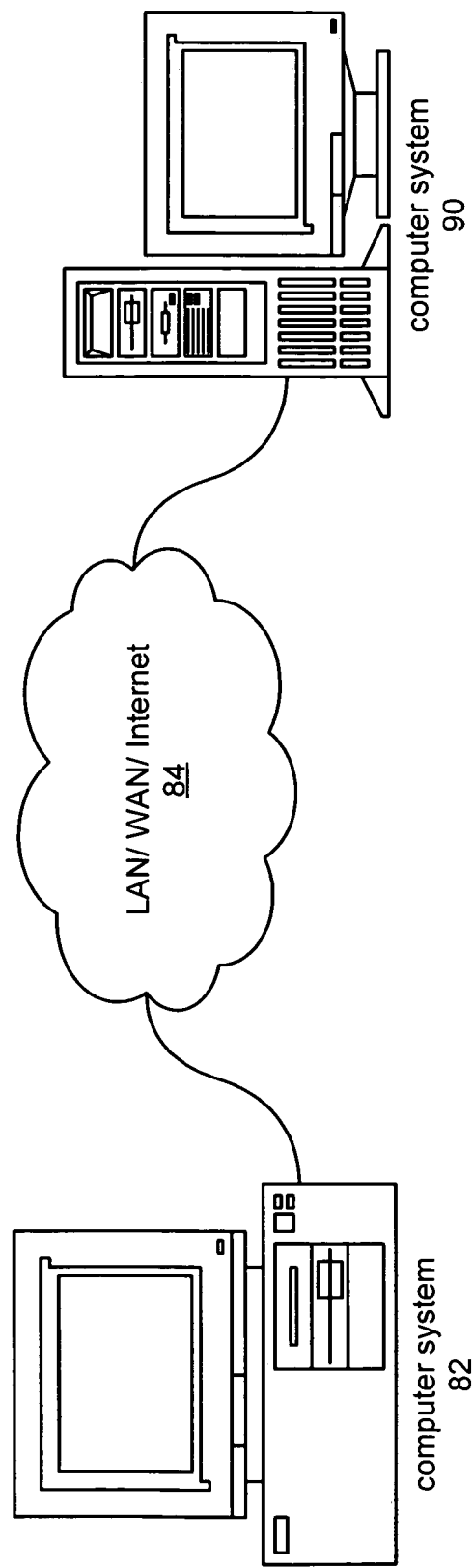
FIG. 1B illustrates a network system comprising two or more computer systems that may implement one embodiment of the present invention.

FIG. 1B—Computer Network

FIG. 1B illustrates a system including a first computer system 82 which is coupled to a second computer system 90. The computer system 82 may be connected through a network 84 (or a computer bus) to the second computer system 90. The computer systems 82 and 90 may each be any of various types, as desired. The network 84 may also be any of various types, including a LAN (local area network), WAN (wide area network), the Internet, or an Intranet, among others.

In some embodiments, the computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device, e.g., a motion control device, connected to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Embodiments of the present invention may have specific applications in fields related to motion control. For example, the systems and methods herein may be applicable to motion control apparatus used for cutting, etching, tracing, and drawing on raw materials, such as wood, silicon (e.g., for electronic circuits), metal, paper, polymer, chemical compounds, chemical elements, etc.

However, it is noted that the present invention can be used for a plethora of applications and is not limited to the above applications. In other words, applications discussed in the present description are exemplary only, and the present invention may be used in any of various types of systems.

Figure 2A:
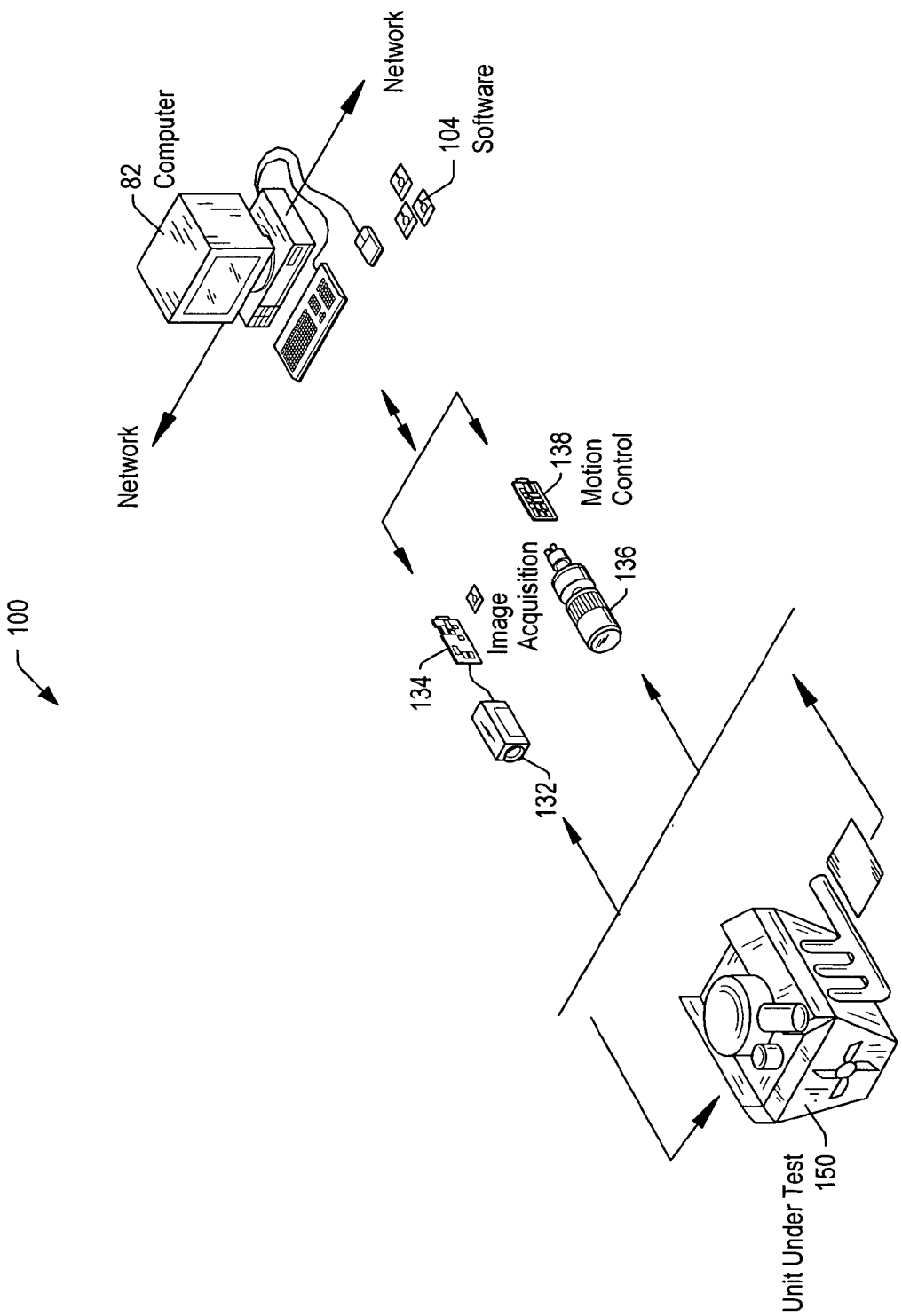
FIG. 2A illustrates an instrumentation control system, according to one embodiment of the invention.

FIG. 2A illustrates an exemplary instrumentation control system 100 which may implement various embodiments of the present invention. The system 100 includes a host computer 82 which may couple to one or more instruments. The host computer 82 may include a CPU, a display screen, memory, and one or more input devices such as a mouse or keyboard as shown. The computer 82 may operate with the one or more instruments to analyze, measure, or control a unit under test (UUT) or process 150.

The one or more instruments may include an image acquisition device 132 and associated image acquisition interface card 134, a motion control device 136 and associated motion control interface card 138, or other suitable. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, a process control application, a man-machine interface application, or a simulation application.

Figure 2B:
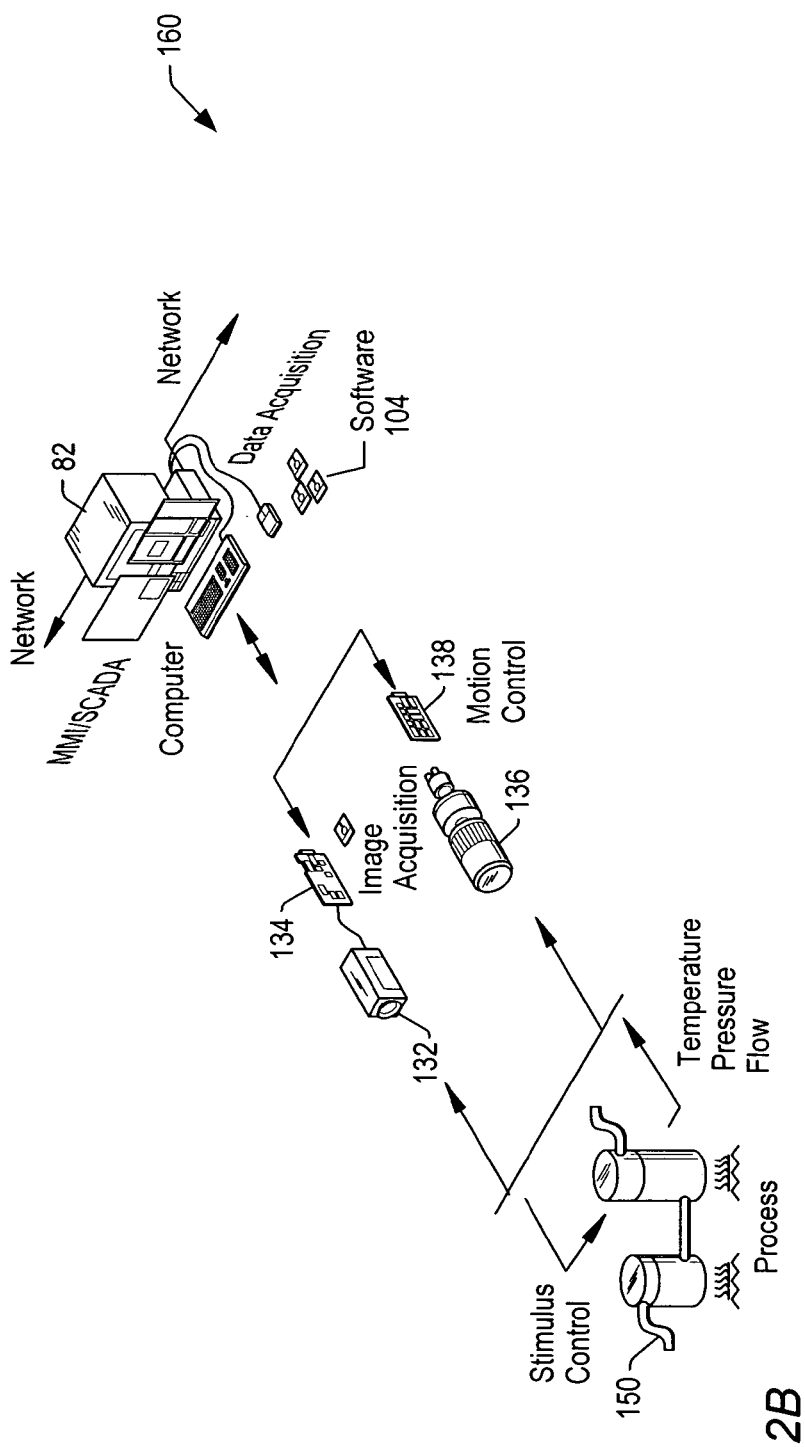
FIG. 2B illustrates an automation system, according to one embodiment of the invention.

FIG. 2B illustrates an exemplary automation system 160 which may implement embodiments of the invention. The automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), process control, advanced analysis, or other control, among others.

The one or more devices may include an image acquisition device 132 and associated image acquisition card 134, a motion control device 136 and associated motion control interface card 138, among other types of devices.

In the embodiments of FIGS. 2A and 2B above, one or more of the various devices may couple to each other over a network, such as the Internet. In one embodiment, the user may select a target device from a plurality of possible target devices for programming or configuration using a program. Thus, the user may use (execute) the program on that computer or deploy the program to a target device (for remote execution on the target device) that is remotely located from the computer and coupled to the computer through a network.

In some embodiments, the program may be a graphical program. It should be noted that graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 3:
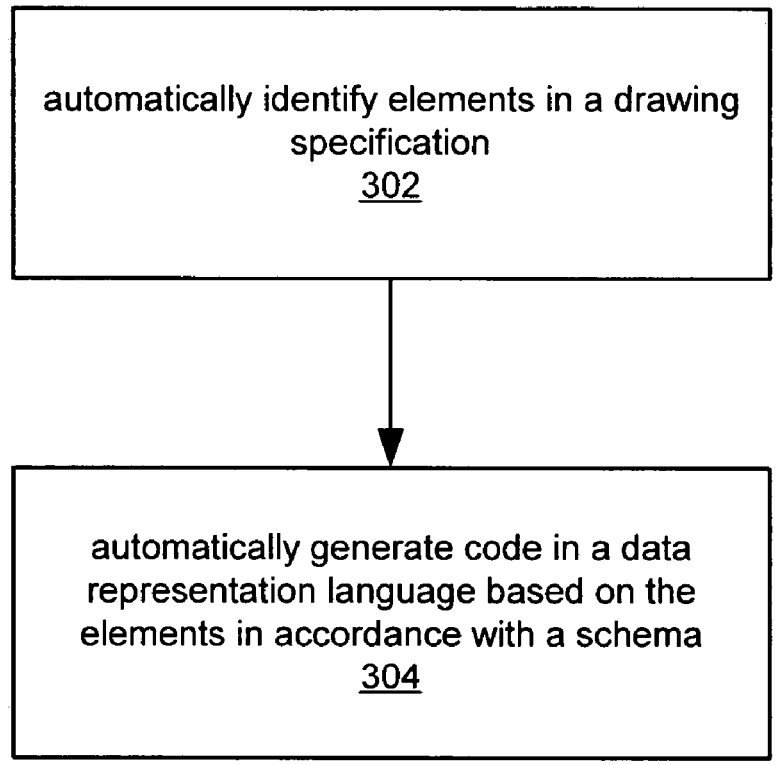
FIG. 3 is a flowchart diagram illustrating a method for utilizing drawing specifications for motion control, according to one embodiment of the present invention.

FIG. 3—Method for Utilizing Drawings for Motion Control

FIG. 3 illustrates a method for utilizing drawing specifications for motion control. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 302, a plurality of elements in a drawing specification (possibly including multiple drawing specifications) may be automatically identified. Additionally, the drawing specification may include or be included in one or more digital files, e.g., one or more AutoCAD digital drafting files. The file(s) may be present on a computer system, e.g., the computer system 82, or may be accessed or downloaded from another computer system, e.g., the computer system 90, via a network, e.g., the network 84. In some embodiments, the drawing specification may include one or more drawings. An image acquisition device, e.g., the image acquisition device 132 and the associated image acquisition card 134, a scanner, a digital camera, or other appropriate device(s), may obtain an image of the drawing(s), which in turn may be analyzed on or by the computer system.

In preferred embodiments, the plurality of elements of the drawing specification may be automatically identified by a program executing on the computer system. In some embodiments, the program executing on the computer system may include one or more text-based programs and/or one or more graphical programs, such as, for example, those implemented in or by the LabVIEW graphical program development environment provided by National Instruments Corporation. Additionally, the program may include a graphical user interface (GUI) executing on the computer system or the other computer system, e.g., the computer system 90, coupled to the computer system.

In some embodiments, the elements may include any of numerous lines and forms specified or included in the drawing specification. For example, the drawing specification may include one or more lines, polygons, arcs, splines, alphanumeric characters with one or more associated fonts, ellipses, and/or clouds, among others. Note that in embodiments where the drawing specification includes one or more AutoCAD digital drafting files, the elements may include entities found or specified in a DXF file format (e.g., the AutoCAD digital drafting file format), although other drafting file formats are also contemplated.

In some embodiments, elements may be nested, i.e., located within one or more other elements in the drawing specification. For example, in FIGS. 4A-4B, elements 402, 404, and 406 are nested within element 400. Each of these elements, and combinations thereof, may be automatically identified, e.g., via the program executing on the computer system. In some embodiments, complex elements may include one or more elements, e.g., subelements, in the drawing specification and may be automatically identified. In some embodiments, one or more elements may form shapes. For example, a series of connected lines and arcs, or other equivalent elements (and/or complex elements), may form a shape, such as, for example, a crescent moon, and may be automatically identified as such. In some embodiments, the shapes may comprise one or more subshapes, which themselves may comprise one or more elements. As a further example, FIGS. 5A-5B illustrate two complex elements, e.g., shapes 502 and 504. In this example, elements 510, 512, 511, and 516 may be automatically identified as complex element (or shape) 502, e.g., via the program. Similarly, complex element (or shape) 504 may be automatically identified as including the elements 520 and 522. Note that in descriptions herein, references to elements may also refer to complex elements included in the drawing specification.

In 304, code for implementing motion control may be automatically generated based on the identified elements in accordance with a schema. Similar to above, the automatic generation may be performed by one or more graphical and/or text-based programs which may be executing on a host computer locally or remotely. In some embodiments, the code may be generated in a data representation language. For example, the code may be generated in a markup language, such as, for example, hyper-text markup language (HTML) or extensible markup language (XML), among others.

In some embodiments, the motion control operations specified by the generated code may be implemented via a motion control device. In one embodiment, the code may include or specify various operations usable by the motion control device, such as (moving in an.) arc, line, or contour, raise, lower, halt, begin, etc. In some embodiments, the motion control device may be a machining device that may draw, trace, etch, and/or cut various materials. The materials may include, for example, one or more of metal, wood, paper, silicon, polymer(s), chemical compound(s), and chemical element(s), among others.

As indicated above, the generated code may include one or more automatically generated move operations. For example, in motion control for machining operations, e.g., etching shapes in materials, the automatically generated code may include raise, move, and lower operations, among others. In some embodiments, the user, or other source, e.g., program, configuration file, etc., may, e.g., via the GUI, enable or disable the raise and lower operations, and additionally, may specify the tool-depth, i.e., the height of the raise and lower operations (if they are enabled). Such operations may allow the material to be cut, etched, traced, etc., in such a way that the now etched, or otherwise modified, material's design resembles the drawing specification. Said another way, because the generated code includes raise and lower operations, moving the tool between different elements may not result in the materials being cut, etched, traced, or otherwise modified undesirably, e.g., modified outside of the borders of the elements.

In some embodiments, each of the move operations may include one or more associated move parameters. The move parameters may include one or more digital outputs which may transmit move information to one or more external devices. For example, a digital output may include a move completion signal; in other words, information regarding the movement may be transmitted to the external device(s) upon completion of the movement. The digital output may include a move initiation signal that may be transmitted to the external device(s) upon initiation of the movement. As a specific example, an external laser, e.g., one performing, for example, cutting of a material, may turn on and off upon receiving initiation and completion signals respectively. In some embodiments, the move parameters may include a position compare, i.e., breakpoint, where the controller may transmit information to the external device(s) upon reaching a specified condition, e.g., a specified position. For example, upon reaching a specified position, the controller may transmit information to, for example, a digital camera, which may capture a digital photograph of a specified object, e.g., a unit under test, such as, for example, a circuit board. In some embodiments, the breakpoint may also specify a set, a toggle, or a reset, among others, of one or more of the axis parameters of the motion control device. In one embodiment, the position compare may be performed cyclically, i.e., periodically, according to specified time or position intervals which may also be specified as a move operation parameter. Note that position compares, and, in particular, those that are periodic, may be especially useful in synchronizing the external device(s) with the motion controller.

In some embodiments, the move parameters may include one or more move constraints, i.e., attributes of the movement of the motion control device, e.g., allowed movements, velocity, acceleration, deceleration, and jerk, among others. For example, if the motion control device cuts a material with an obstacle on or near the surface of the material, the move constraints may specify that only movements around the obstacle are "allowed". In other words, the move constraints may allow the material to be cut, or to be modified via some other equivalent operation, in a desirable fashion. As indicated above, the move constraints may also specify the rate at which the motion is performed, e.g., via the velocity, acceleration, deceleration, and/or jerk move constraints.

In some embodiments, the parameters may be specified via various methods, e.g., automatically, or via a user or other system, at various times. For example, a user, e.g., via the GUI, or automation system may specify upper and lower bound velocity, acceleration, deceleration, and/or jerk constraints before automatic generation of the code. These specifications may be especially desirable in systems where the controlled device must operate within a certain velocity range in order to avoid damage of the material and/or the device. For example, use of a massive cutting tool may impose upper bounds on velocity and/or acceleration due to the tool's size and weight. As another example, the thickness of the material being cut may impose an upper bound on the velocity, e.g., a laser cutting a two-inch sheet of metal may require that the laser move slowly in order to achieve the cut as provided by the specification. In these cases, the code may be automatically generated in accordance with the specified bounds, i.e., the move constraint parameters may be constrained to be within the upper and/or lower bounds. Additionally or alternatively, the parameters may be specified subsequent to automatic code generation; in these cases, the code may be automatically modified or regenerated in accordance with the specifications. Further modifications of the automatically generated code will be described in more detail below.

Figure 6:
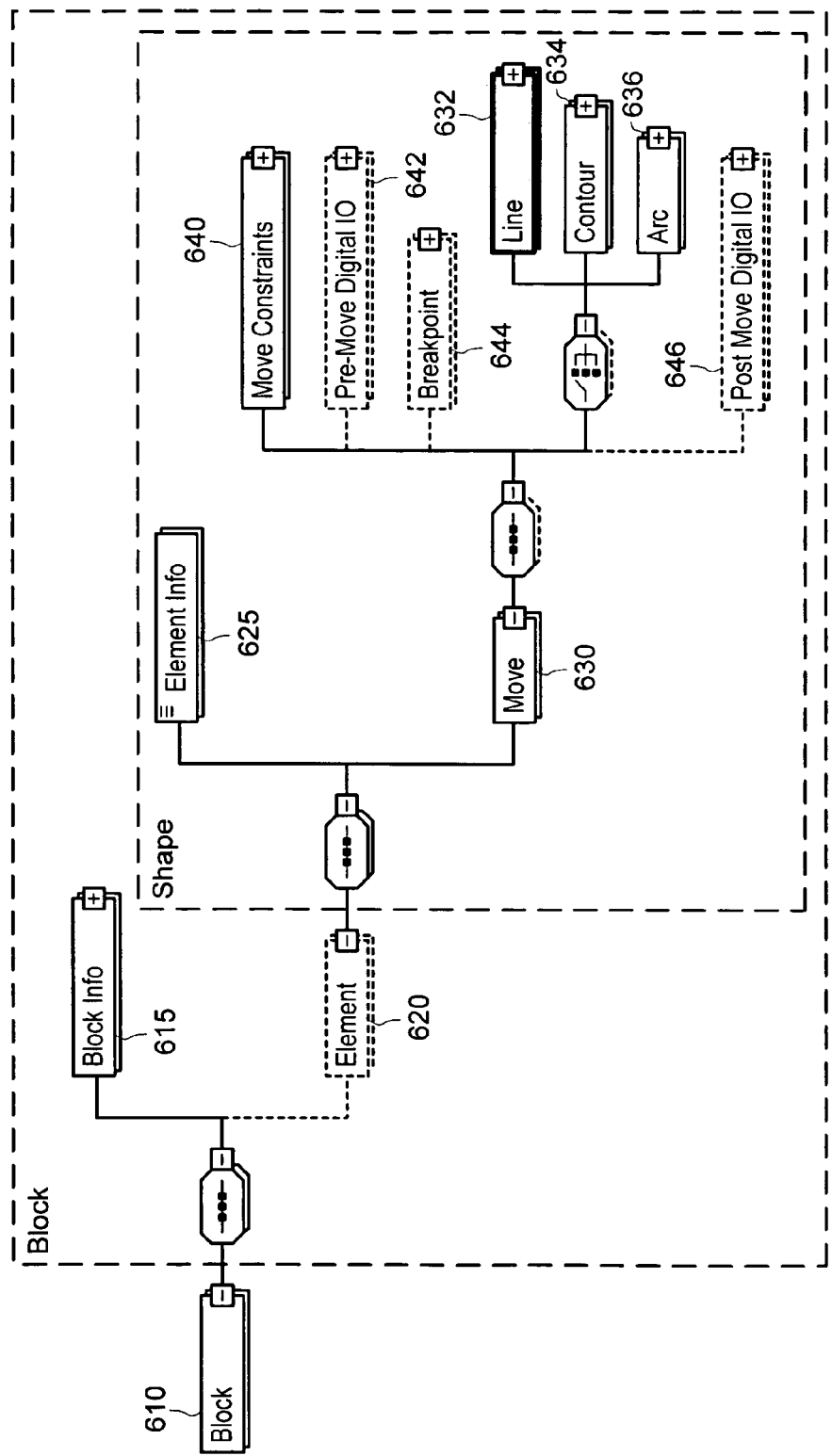
FIG. 6 illustrates an exemplary diagram of a schema, according to some embodiments of the invention.

As indicated above, the code may be automatically generated according to a schema. In some embodiments, the schema may be organized according to the following descriptions. The automatically generated code may have one or more blocks, e.g., block 610 of FIG. 6, with associated information regarding each of the one or more blocks, e.g., block info 615. In some embodiments, the blocks may correspond to respective portions of the drawing specification, e.g., the portions may include, for example, one or more drawings, digital files, or AutoCAD digital drafting files, among others. Each block may in turn have one or more associated elements, e.g., element 620, and information regarding each of the one or more associated elements, e.g., element info 625. The elements included in the generated code may represent or correspond to the automatically identified elements described above in 302. As indicated above, each element may have one or more associated move operations, e.g., line 632, contour 634, and/or arc 636, among others, represented generically as move 630. As also indicated above, each move operation may have one or more associated parameters, e.g., move constraint(s) 640, pre-move digital IO 642, breakpoint 644, and/or post-move digital IO 646, among others.

In some embodiments, the generated code may be suitable for direct implementation or deployment on a motion control device, or a controller for the motion control device. In alternate embodiments, the code may be generated in a generic language, e.g., a generic language, such as, for example, XML, that may in turn be translated into any of various desired languages, such as C, Pascal, Fortran, Java, graphical programming languages, e.g., LabVIEW, scripting languages, various third-party languages, and/or various platform specific languages, among others. In some embodiments, the user (e.g., via the GUI) may choose an ultimate destination language to which the generic code may be automatically converted, or provide code that can translate the generated code to a desired destination language. This code encoded in a destination language may be implemented directly onto the motion control device, or alternatively, may be implemented via a controller. In some embodiments, the code may include or be used to generate API calls for the motion control device. The destination code, or intermediate code, may include one or more graphical programs and/or text-based programs. In one embodiment, the code may include pseudo code that may be automatically documented and easily understood.

The GUI may also display a visual representation of the generated code to the user via the display of the computer system. In some embodiments, the user may be able to choose viewing preferences in the GUI such that the move operations may or may not be displayed. For example, the GUI may display dotted lines, such as those illustrated in FIGS. 4A-4B and 5A-5B, illustrating move operations (as well as other inserted operations, e.g., raise and lower operations) according to the user's viewing preferences. Note that the user's viewing preferences are not limited to move operations, and in fact, other viewing preferences are envisioned, such as window size, window placement, colors, and text fonts and sizes, among others.

In some embodiments, user input received to the GUI may invoke one or more of the automatic identification (302) and the automatic generation of code (304).

In some embodiments, the method may also include receiving input specifying modification to the generated code. The input may be received by the user, e.g., via the GUI, or by another device or system, e.g., a computer system. The modification may include modifying existing portions of the generated code, e.g., machine tool operations, elements, raise and lower dimensions, etc., and/or adding new portions to the generated code, e.g., adding new elements, move operations, or other suitable portions of code to the generated code. Additionally, as described above, the modification may include modifying or specifying one or more parameters of the move operations included in the generated code. For example, the input may specify removal of a breakpoint from or addition of a breakpoint to a move operation. Similarly, the input may specify the addition of a digital output or a modification of a digital output such that it transmits specific data, e.g., command(s), string(s), number(s), etc., to one or more external devices. Note that any of various parameters may be added or modified as desired, and the above listed parameter modifications are exemplary only.

In some embodiments, the generated code may be displayed in a text format, e.g., the GUI may show the generated code itself, such as code generated in XML. In this case, the user may change the generated code directly, e.g., via a keyboard coupled to the computer system.

In other embodiments, the generated code may be displayed in a graphical format. For example, the GUI may have graphical representations of the code (such as those illustrated in FIGS. 4A-4B and 5A-5B) that may be modified graphically, e.g., using a mouse. For instance, the user may change a move operation parameter by double-clicking one of the parameters and entering a new one, e.g., via a keyboard coupled to the computer. In some embodiments, the user may change the blocks, the elements, the machine move operations (e.g., the dotted lines illustrated in FIGS. 4A-4B and 5A-5B), the move operation parameters, or other suitable properties of the generated code by dragging and dropping the lines or the elements displayed in the GUI (e.g., the visual representation of the generated code). Thus, the generated code may be modified via various methods; however, it should be noted that embodiments of the present invention are not limited to the modification methods described above and that other methods are envisioned.

After receiving input specifying these modifications to the generated code, the method may also include automatically modifying the generated code based on the modifications specified by the user (or another device or system) in accordance with the schema. The modified code may subsequently be modified and generated according to further input and/or implemented for motion control as indicated above, e.g., in an iterative manner.

Figure 4A:
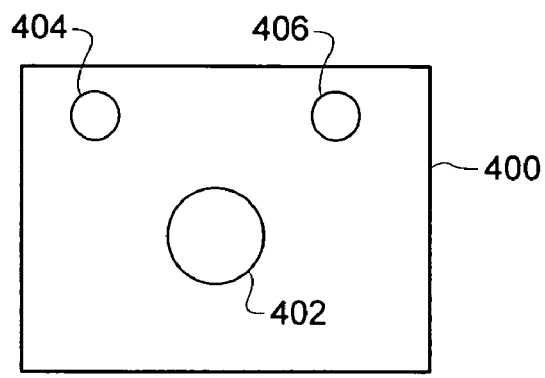
FIGS. 4A-4B and 5A-5B illustrate exemplary drawing specifications and respective motion control solutions, according to some embodiments of the invention.
Figure 4B:
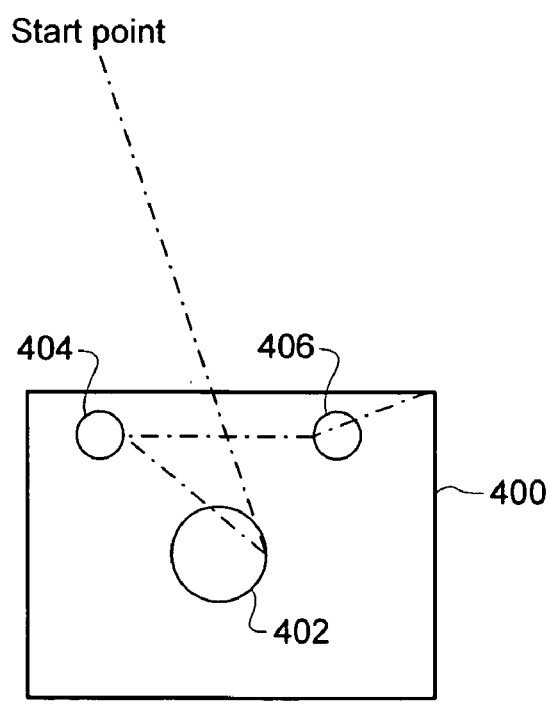
Figure 5A:
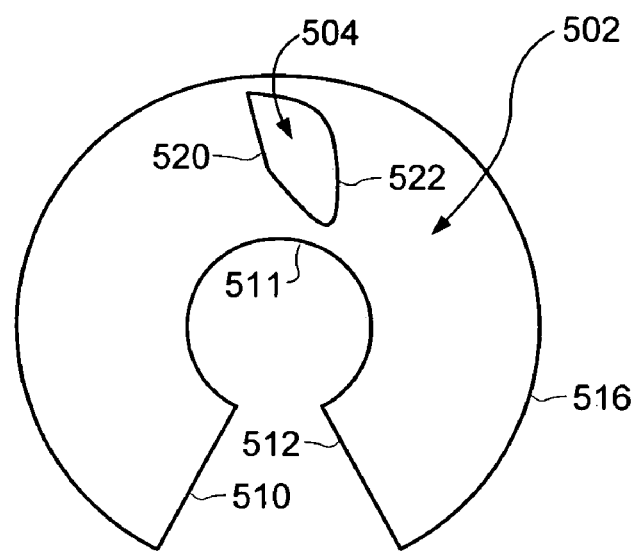
Figure 5B:
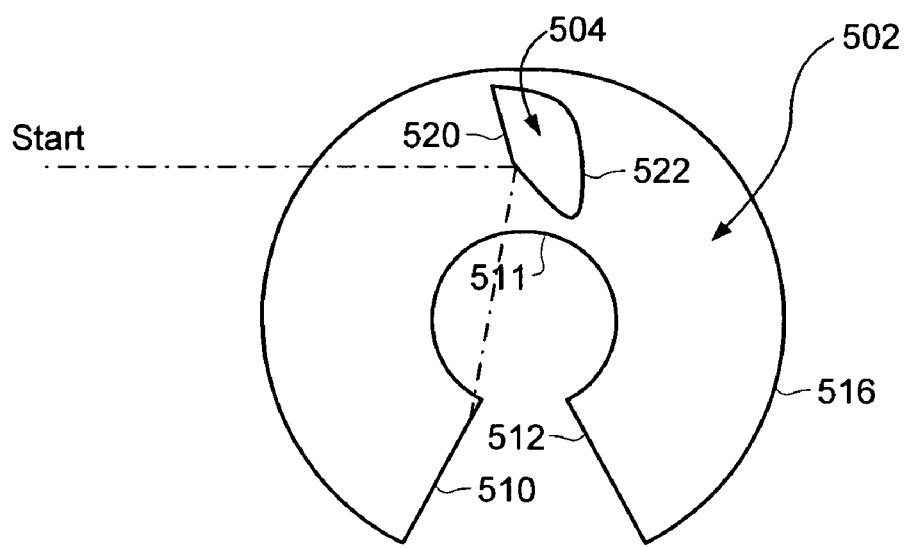

As described above, FIGS. 4A and 4B illustrate an example of a drawing specification (4A) and a corresponding motion path (4B) for a motion control device. According to one embodiment, XML code may be generated from the drawing specification in FIG. 4A. For example, code may be generated according to the schema described above. As indicated above, the code may include a block, corresponding to the drawing specification, which itself may contain a block info section, providing information regarding the block, e.g., boardID (e.g., the ID of the specific motion control device being used), vectorspace (e.g., the space in which moves, positions, and/or axis are defined), xaxis, yaxis, zaxis, and units. In one embodiment, the first portion of the code pertaining to FIG. 4A may be generated as:

```
<Block name="Figure 4A">
    <BlockInfo>
        <BoardID>1</BoardID>
        <VectorSpace>17</VectorSpace>
        <XAxis>1</XAxis>
        <YAxis>2</YAxis>
        <ZAxis>0</ZAxis>
        <Units>Counts</Units>
    </BlockInfo>
```

As also described above, the block may include identified elements, e.g., elements 402, 404, and 406, with corresponding element infos, e.g., the element's name. Additionally, each element section may contain one or more moves, e.g., the dotted line from the start point to element 402 in FIG. 4B, each with one or more move constraints, e.g., velocity, acceleration, deceleration, and jerk. In one embodiment, a portion of the element's code, e.g., the inserted move from the start point to element 402, may be generated as:

```
<Element>
    <ElementName> Element 402</ElementName>
    <Move>
        <MoveConstraints>
            <Velocity>10000.000000</Velocity>
            <Acceleration>100000.000000</Acceleration>
            <Deceleration>100000.000000</Deceleration>
            <Jerk>1.000000</Jerk>
        </MoveConstraints>
        <StraightLine>
            <MoveType>StraightLine</MoveType>
            <XPosition>20352.631124</XPosition>
            <YPosition>30065.625772</YPosition>
            <ZPosition>0.000000</ZPosition>
        </StraightLine>
    </Move>
```

Upon reaching the element, the shape may be etched, drawn, cut, etc., according to another move, e.g., an arc tracing the outline of element 402, generated inside of the code of element 402 as:

```
<Move>
    <MoveConstraints>
        <Velocity>10000.000000</Velocity>
        <Acceleration>100000.000000</Acceleration>
        <Deceleration>100000.000000</Deceleration>
        <Jerk>1.000000</Jerk>
    </MoveConstraints>
    <Arc>
        <Radius>1707.358366</Radius>
        <StartAngle>360.000000</StartAngle>
        <TravelAngle>-360.000000</TravelAngle>
    </Arc>
```

Subsequently, a breakpoint, i.e., a position compare, may be inserted, e.g., automatically or via user input to the GUI. In some embodiments, the breakpoint may have associated breakpoint action sections, e.g., BPAction, which may specify the action for each axis. In one embodiment, the XML code may use a '0' for no action, a '1' for a reset function, a '2' for a set function, and a '3' for a toggle function, among others. The coordinates of the breakpoint may be specified in single, multiple, and/or periodic breakpoints and may be specified relative to another point, or in an absolute coordinate sense, e.g., the exact coordinates may be specified in a coordinate plane, or the position may be specified relative to another position, e.g., a previous position. Following the example of FIGS. 4A and 4B, code for the breakpoint may be generated as:

```
<BreakPoint>
    <BPAction>
        <XAction>1</XAction>
        <YAction>1</YAction>
        <ZAction>0</ZAction>
    </BPAction>
    <Single>
        <Relative>
            <XPoint>5003</XPoint>
            <YPoint>5003</YPoint>
            <ZPoint>0</ZPoint>
        </Relative>
    </Single>
</BreakPoint>
</Move>
</Element>
```

Elements 404, 406, and 400 may be similarly traced, etched, cut, etc. according to the schema. Note that the above code is exemplary only, and, as indicated above, other suitable codes, organizations, and schemas are envisioned.

FIGS. 5A and 5B illustrate another example of a drawing specification (5B) and corresponding motion path (5B). Thus, similar to the above example regarding FIGS. 4A and 4B, the method may generate code for implementing an operation, e.g., cutting a material as specified by a drawing specification, e.g., FIG. 5A, via a motion path included in the generated code, e.g., as indicated in FIG. 5B (e.g., inserting a movement operation to complex element 504, cutting complex element 504, inserting a raise, move, and lower operation to complex element 502, and cutting complex element 502).

Thus, in various embodiments of the present invention, code implementing motion control operations may be automatically generated in a data representation language based on a drawing specification in accordance with a schema.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for utilizing drawing specifications for use in motion control, comprising using a computer to perform:
   automatically identifying one or more elements in a drawing specification, wherein the drawing specification is stored in a memory; and
   automatically generating code based on the one or more elements in accordance with a schema, wherein the code comprises instructions in a data representation language, wherein the data representation language comprises a markup language, and wherein the code is usable for implementing motion control;
   wherein said automatically generating code comprises automatically generating one or more move operations and wherein the one or more move operations comprise one or more of:
   a line move operation;
   an arc move operation;
   a contour move operation;
   a begin move operation;
   a halt move operation;
   a raise move operation; or
   a lower move operation.

2. The method of claim 1, wherein said automatically generating code based on the one or more elements in accordance with a schema comprises:
   generating one or more blocks, each corresponding to a respective portion of the drawing specification;
   wherein each of the one or more blocks comprises a respective one or more elements of the one or more elements; and
   wherein each of the respective one or more elements comprises one or more associated move operations.

3. The method of claim 2,
   wherein each of the one or more move operations comprises one or more associated parameters.

4. The method of claim 2, wherein each of the one or more respective portions comprises one or more of:
   a drawing; or
   a digital drafting file.

5. The method of claim 1,
   wherein the drawing specification comprises one or more digital files.

6. The method of claim 1,
   wherein the drawing specification comprises one or more AutoCAD digital drafting files.

7. The method of claim 1,
   wherein the drawing specification comprises one or more drawings.

8. The method of claim 1,
   wherein the drawing specification comprises one or more drawing specifications.

9. The method of claim 1,
   wherein the one or more move operations each have one or more associated parameters.

10. The method of claim 9,
    wherein the one or more associated parameters comprise one or more of:
    one or more move constraints;
    one or more digital outputs; or
    one or more position compares.

11. The method of claim 1,
wherein the data representation language comprises eXtensible Markup Language (XML).

12. The method of claim 1,
wherein the generated code comprises instructions usable to control a motion control device, wherein the motion control device is operable to perform one or more of:
drawing on one or more materials;
tracing one or more materials;
etching one or more materials; or
cutting one or more materials.

13. The method of claim 11,
wherein the one or more materials comprise one or more of:
metal;
wood;
polymer;
one or more chemical compounds; or
one or more chemical elements.

14. The method of claim 1,
wherein the one or more elements comprise one or more of:
one or more lines;
one or more polygons;
one or more arcs;
one or more splines;
one or more alphanumeric characters in one or more associated fonts;
one or more ellipses; or
one or more clouds.

15. The method of claim 1,
wherein the one or more elements compose one or more shapes, wherein each shape of the one or more shapes comprises a subset of the one or more elements.

16. The method of claim 1,
wherein the one or more elements compose one or more complex elements, wherein each complex element of the one or more complex elements comprises a subset of the one or more elements.

17. The method of claim 1,
wherein said automatically identifying the one or more of elements and said automatically generating code is performed by one or more graphical programs, wherein each of the one or more graphical programs comprises a plurality of interconnected nodes that visually indicate functionality of the graphical program.

18. The method of claim 1, the method further comprising:
displaying a visual representation of the generated code in a graphical user interface (GUI) displayed on a display device of a computer system.

19. The method of claim 1, the method further comprising:
receiving user input to a GUI invoking one or more of said automatically identifying the one or more elements and said automatically generating code.

20. The method of claim 1, the method further comprising:
receiving user input to a GUI specifying modification of the generated code; and
automatically modifying the generated code based on the user input.

21. The method of claim 1, the method further comprising:
automatically inserting move operations into the generated code; and
receiving user input to a GUI displayed on a display device of a computer system, wherein the GUI indicates the move operations, and wherein the user input specifies enabling or disabling display of the move operations.

22. A system for utilizing drawing specifications for use in motion control, comprising:

means for automatically identifying one or more elements in a drawing specification; and
means for automatically generating code based on the one or more elements in accordance with a schema, wherein the code comprises instructions in a data representation language, wherein the data representation language comprises a markup language, and wherein the code is usable for implementing motion control;
wherein said automatically generating code comprises automatically generating one or more move operations and wherein the one or more move operations comprise one or more of:
a line move operation;
an arc move operation;
a contour move operation;
a begin move operation;
a halt move operation;
a raise move operation; or
a lower move operation.

23. A computer-accessible memory medium for utilizing drawing specifications for use in motion control, comprising instructions executable by a processor to implement:
automatically identifying one or more elements in a drawing specification; and
automatically generating code based on the one or more elements in accordance with a schema, wherein the code comprises instructions in a data representation language, wherein the data representation language comprises a markup language, and wherein the code is usable for implementing motion control;
wherein said automatically generating code comprises automatically generating one or more move operations and wherein the one or more move operations comprise one or more of:
a line move operation;
an arc move operation;
a contour move operation;
a begin move operation;
a halt move operation;
a raise move operation; or
a lower move operation.

24. The memory medium of claim 22, wherein said automatically generating code based on the one or more elements in accordance with a schema comprises:
generating one or more blocks, each corresponding to a respective portion of the drawing specification;
wherein each of the one or more blocks comprises a respective one or more elements of the one or more elements; and
wherein each of the respective one or more elements comprises one or more associated move operations.

25. The memory medium of claim 23,
wherein each of the one or more move operations comprises one or more associates parameters.

26. The memory medium of claim 23,
wherein the drawing specification comprises one or more digital files.

27. The memory medium of claim 23,
wherein the drawing specification comprises one or more AutoCAD digital drafting files.

28. The memory medium of claim 23,
wherein the drawing specification comprises one or more drawings.

29. The memory medium of claim 23, wherein the one or more elements compose one or more shapes, wherein each shape of the one or more shapes comprises a subset of the one or more elements.

30. The memory medium of claim 23, wherein the one or more elements compose one or more complex elements, wherein each complex element of the one or more complex elements comprises a subset of the one or more elements.

31. The memory medium of claim 23,
wherein said automatically identifying the one or more of elements and said automatically generating code is performed by one or more graphical programs, wherein each of the one or more graphical programs comprises a plurality of interconnected nodes that visually indicate functionality of the graphical program.

32. The memory medium of claim 23, wherein the program instructions are further executable to:
display a visual representation of the generated code in a graphical user interface (GUI) displayed on a display device of a computer system.

33. The memory medium of claim 23, wherein the program instructions are further executable to:
receive user input to a GUI invoking one or more of said automatically identifying the one or more elements and said automatically generating code.

34. The memory medium of claim 23, wherein the program instructions are further executable to:
receive user input to a GUI specifying modification of the generated code; and
automatically modify the generated code based on the user input.

35. The memory medium of claim 26, wherein the program instructions are further executable to:
automatically insert move operations into the generated code; and
receive user input to a GUI displayed on a display device of a computer system, wherein the GUI indicates the move operations, and wherein the user input specifies enabling or disabling display of the move operations.

36. A method for utilizing drawing specifications for use in motion control, comprising using a computer to perform:
automatically identifying one or more elements in a drawing specification, wherein the drawing specification is stored in a memory; and
automatically generating code based on the one or more elements in accordance with a schema, wherein the code comprises instructions in a data representation language, wherein the data representation language comprises a markup language, and wherein the code is usable for implementing motion control;
wherein said automatically identifying the one or more of elements and said automatically generating code is performed by one or more graphical programs, wherein each of the one or more graphical programs comprises a plurality of interconnected nodes that visually indicate functionality of the graphical program.

37. The method of claim 36, wherein said automatically generating code based on the one or more elements in accordance with a schema comprises:
generating one or more blocks, each corresponding to a respective portion of the drawing specification;
wherein each of the one or more blocks comprises a respective one or more elements of the one or more elements; and
wherein each of the respective one or more elements comprises one or more associated move operations.

38. The method of claim 36,
wherein the one or more move operations each have one or more associated parameters.

39. The method of claim 38,
wherein the one or more associated parameters comprise one or more of:
one or more move constraints;
one or more digital outputs; or
one or more position compares.

40. The method of claim 36,
wherein the generated code comprises instructions usable to control a motion control device, wherein the motion control device is operable to perform one or more of:
drawing on one or more materials;
tracing one or more materials;
etching one or more materials; or
cutting one or more materials.

41. The method of claim 36,
wherein the one or more elements compose one or more shapes, wherein each shape of the one or more shapes comprises a subset of the one or more elements.

42. The method of claim 36,
wherein the one or more elements compose one or more complex elements, wherein each complex element of the one or more complex elements comprises a subset of the one or more elements.

43. The method of claim 36, the method further comprising:
receiving user input to a GUI specifying modification of the generated code; and automatically modifying the generated code based on the user input.

44. A computer-accessible memory medium for utilizing drawing specifications for use in motion control, comprising instructions executable by a processor to implement:
automatically identifying one or more elements in a drawing specification; and
automatically generating code based on the one or more elements in accordance with a schema, wherein the code comprises instructions in a data representation language, wherein the data representation language comprises a markup language, and wherein the code is usable for implementing motion control;
wherein said automatically identifying the one or more of elements and said automatically generating code is performed by one or more graphical programs, wherein each of the one or more graphical programs comprises a plurality of interconnected nodes that visually indicate functionality of the graphical program.

45. The memory medium of claim 44, wherein said automatically generating code based on the one or more elements in accordance with a schema comprises:
generating one or more blocks, each corresponding to a respective portion of the drawing specification;
wherein each of the one or more blocks comprises a respective one or more elements of the one or more elements; and
wherein each of the respective one or more elements comprises one or more associated move operations.

46. The memory medium of claim 44,
wherein the one or more move operations each have one or more associated parameters.

47. The memory medium of claim 46,
wherein the one or more associated parameters comprise one or more of:
one or more move constraints;
one or more digital outputs; or
one or more position compares.

48. The memory medium of claim 44,
wherein the generated code comprises instructions usable to control a motion control device, wherein the motion control device is operable to perform one or more of:
drawing on one or more materials;
tracing one or more materials;
etching one or more materials; or
cutting one or more materials.

49. The memory medium of claim 44,
wherein the one or more elements compose one or more shapes, wherein each shape of the one or more shapes comprises a subset of the one or more elements.

50. The memory medium of claim 44,
wherein the one or more elements compose one or more complex elements, wherein each complex element of the one or more complex elements comprises a subset of the one or more elements.

51. The memory medium of claim 44, wherein the program instructions are further executable to:
receive user input to a GUI specifying modification of the generated code; and automatically modify the generated code based on the user input.

52. A method for utilizing drawing specifications for use in motion control, comprising using a computer to perform:
automatically identifying one or more elements in a drawing specification, wherein the drawing specification is stored in a memory; and
automatically generating code based on the one or more elements in accordance with a schema, wherein the code comprises instructions in a data representation language, wherein the data representation language comprises a markup language, and wherein the code is usable for implementing motion control;
automatically inserting move operations into the generated code; and
receiving user input to a GUI displayed on a display device of a computer system, wherein the GUI indicates the move operations, and wherein the user input specifies enabling or disabling display of the move operations.

53. The method of claim 52, wherein said automatically generating code based on the one or more elements in accordance with a schema comprises:
generating one or more blocks, each corresponding to a respective portion of the drawing specification;
wherein each of the one or more blocks comprises a respective one or more elements of the one or more elements; and
wherein each of the respective one or more elements comprises one or more associated move operations.

54. The method of claim 52,
wherein the one or more move operations each have one or more associated parameters.

55. The method of claim 54,
wherein the one or more associated parameters comprise one or more of:
one or more move constraints;
one or more digital outputs; or
one or more position compares.

56. The method of claim 52,
wherein the generated code comprises instructions usable to control a motion control device, wherein the motion control device is operable to perform one or more of:
drawing on one or more materials;
tracing one or more materials;
etching one or more materials; or
cutting one or more materials.

57. The method of claim 52,
wherein the one or more elements compose one or more shapes, wherein each shape of the one or more shapes comprises a subset of the one or more elements.

58. The method of claim 52,
wherein the one or more elements compose one or more complex elements, wherein each complex element of the one or more complex elements comprises a subset of the one or more elements.

59. The method of claim 52, the method further comprising: receiving user input to a GUI specifying modification of the generated code; and automatically modifying the generated code based on the user input.

60. A computer-accessible memory medium for utilizing drawing specifications for use in motion control, comprising instructions executable by a processor to implement:
automatically identifying one or more elements in a drawing specification; and
automatically generating code based on the one or more elements in accordance with a schema, wherein the code comprises instructions in a data representation language, wherein the data representation language comprises a markup language, and wherein the code is usable for implementing motion control;
automatically inserting move operations into the generated code; and
receiving user input to a GUI displayed on a display device of a computer system, wherein the GUI indicates the move operations, and wherein the user input specifies enabling or disabling display of the move operations.

61. The memory medium of claim 60, wherein said automatically generating code based on the one or more elements in accordance with a schema comprises:
generating one or more blocks, each corresponding to a respective portion of the drawing specification;
wherein each of the one or more blocks comprises a respective one or more elements of the one or more elements; and
wherein each of the respective one or more elements comprises one or more associated move operations.

62. The memory medium of claim 60, wherein the one or more move operations each have one or more associated parameters.

63. The memory medium of claim 62,
wherein the one or more associated parameters comprise one or more of:
one or more move constraints;
one or more digital outputs; or
one or more position compares.

64. The memory medium of claim 60,
wherein the generated code comprises instructions usable to control a motion control device, wherein the motion control device is operable to perform one or more of:
drawing on one or more materials;
tracing one or more materials;
etching one or more materials; or
cutting one or more materials.

65. The memory medium of claim 60,
wherein the one or more elements compose one or more shapes, wherein each shape of the one or more shapes comprises a subset of the one or more elements.

66. The memory medium of claim 60,
wherein the one or more elements compose one or more complex elements, wherein each complex element of the one or more complex elements comprises a subset of the one or more elements.

67. The memory medium of claim 60, wherein the program instructions are further executable to:
receive user input to a GUI specifying modification of the generated code; and automatically modify the generated code based on the user input.

* * * * *

UNITED STATES PATENT AND TRADEMARK OFFICE
CERTIFICATE OF CORRECTION

PATENT NO. : 7,702,417 B2  Page 1 of 1
APPLICATION NO. : 11/343410
DATED : April 20, 2010
INVENTOR(S) : Ravish et al.

It is certified that error appears in the above-identified patent and that said Letters Patent is hereby corrected as shown below:

In the Claims:

Column 19
Line 12, please delete "The method of claim 11," and substitute -- The method of claim 12, --.

Column 20
Line 42, please delete "The memory medium of claim 22," and substitute -- The memory medium of claim 23, --.

Column 20
Line 54, please delete "one or more associates parameters" and substitute -- one or more associated parameters --.

Column 21
Line 29, please delete "The memory medium of claim 26," and substitute -- The memory medium of claim 23, --.

Signed and Sealed this

First Day of June, 2010

David J. Kappos
*Director of the United States Patent and Trademark Office*